(12) United States Patent
Shin

(10) Patent No.: US 12,517,663 B2
(45) Date of Patent: Jan. 6, 2026

(54) STORAGE DEVICE PERFORMING READ OPERATION AND METHOD OF OPERATING THE SAME

(71) Applicant: SK hynix Inc., Gyeonggi-do (KR)

(72) Inventor: Woong Sik Shin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 43 days.

(21) Appl. No.: 18/520,563

(22) Filed: Nov. 28, 2023

(65) Prior Publication Data
US 2024/0419341 A1 Dec. 19, 2024

(30) Foreign Application Priority Data

Jun. 19, 2023 (KR) .......................... 10-2023-0078139

(51) Int. Cl.
| | |
|---|---|
| G06F 12/00 | (2006.01) |
| G06F 3/06 | (2006.01) |
| G06F 12/02 | (2006.01) |
| G06F 12/1009 | (2016.01) |

(52) U.S. Cl.
CPC .......... G06F 3/0625 (2013.01); G06F 3/0659 (2013.01); G06F 3/0673 (2013.01); G06F 12/023 (2013.01); G06F 12/1009 (2013.01)

(58) Field of Classification Search
CPC .... G06F 3/0625; G06F 3/0659; G06F 3/0673; G06F 12/023; G06F 12/1009; G06F 2212/7209; G06F 12/0246; G06F 3/0604; G06F 3/0658; G06F 2212/1016; G06F 2212/1028

USPC ......................................................... 711/154
See application file for complete search history.

(56) References Cited

U.S. PATENT DOCUMENTS

| | | | |
|---|---|---|---|
| 11,120,851 B1 * | 9/2021 | Fujioka | G11C 7/1018 |
| 2009/0168532 A1 * | 7/2009 | Sel | H10B 41/30 |
| | | | 257/315 |
| 2013/0238931 A1 * | 9/2013 | Suzuki | G09C 1/00 |
| | | | 714/15 |
| 2017/0116070 A1 * | 4/2017 | Alrod | G11C 16/26 |
| 2018/0090202 A1 * | 3/2018 | Kaminaga | G11C 16/26 |
| 2020/0012694 A1 * | 1/2020 | Chiu | G06F 16/90335 |
| 2024/0233813 A1 * | 7/2024 | Guo | G11C 11/4085 |

FOREIGN PATENT DOCUMENTS

| | | |
|---|---|---|
| KR | 10-2021-0152750 A | 12/2021 |
| KR | 10-2022-0013719 A | 2/2022 |

\* cited by examiner

*Primary Examiner* — Mardochee Chery
(74) *Attorney, Agent, or Firm* — IP&T GROUP LLP

(57) ABSTRACT

Provided herein may be a storage device and a method of operating the same. The storage device may include a memory device including a plurality of pages in which data is stored, and a memory controller configured to provide, when a read request is externally received, address information including a physical address and a dummy address to the memory device. The memory device may perform a successive read operation of sequentially reading data from pages starting from a selected page corresponding to the physical address, among the plurality of pages, according to the dummy address.

24 Claims, 14 Drawing Sheets

FIG. 4

|    | D1  | D2  | D3  | D4  | D5  | D6  | D7  | D8  |
|----|-----|-----|-----|-----|-----|-----|-----|-----|
| T1 | A1  | A2  | A3  | A4  | A5  | A6  | A7  | A8  |
| T2 | A9  | A10 | A11 | A12 | A13 | A14 | A15 | A16 |
| T3 | A17 | A18 | A19 | A20 | A21 | A22 | A23 | A24 |
| T4 | A25 | A26 | A27 | A28 | A29 | A30 | A31 | A32 |
| T5 | A33 | A34 | A35 | A36 | A37 | A38 | A39 | A40 |

STORAGE DEVICE PERFORMING READ OPERATION AND METHOD OF OPERATING THE SAME

CROSS-REFERENCE TO RELATED APPLICATION

The present application claims priority under 35 U.S.C. § 119(a) to Korean patent application number 10-2023-0078139 filed on Jun. 19, 2023, the entire disclosure of which is incorporated by reference herein.

BACKGROUND

1. Field of Invention

Various embodiments of the present disclosure relate to an electronic device, and more particularly to a storage device and a method of operating the storage device.

2. Description of Related Art

A storage device is a device which stores data according to a request from a host, such as a computer or a smartphone. The storage device may include a memory device in which data is stored and a memory controller which communicates with the host and controls the memory device.

The memory controller may read data stored in the memory device by transmitting a read command and an address to the memory device. The memory controller may read pieces of successive data stored in the memory device through a method of transmitting a read command and an address to the memory device to read the data stored in the memory device and thereafter transmitting the read command and the next address to the memory device.

SUMMARY

Various embodiments of the present disclosure are directed to a storage device capable of improving read performance and reducing power consumption, and a method of operating the storage device.

An embodiment of the present disclosure may provide for a storage device. The storage device may include a memory device including a plurality of pages in which data is stored, and a memory controller configured to provide, when a read request is externally received, address information including a physical address and a dummy address to the memory device. The memory device may perform a successive read operation of sequentially reading data from pages starting from a selected page corresponding to the physical address, among the plurality of pages, according to the dummy address.

An embodiment of the present disclosure may provide for a method of operating a storage device including a memory device and a memory controller. The method may include providing, by the memory controller, address information including a physical address and a dummy address from the memory controller to the memory device, and performing, by the memory device, a successive read operation of sequentially reading data from storage areas starting from a selected storage area of the memory device corresponding to the physical address according to the dummy address.

An embodiment of the present disclosure may provide for a memory device. The memory device may include a plurality of pages configured to store data, and a control logic configured to perform, when address information including a physical address and a dummy address is externally received, a successive read operation of sequentially reading data from pages starting from a selected page corresponding to the physical address, among the plurality of pages, according to the dummy address.

BRIEF DESCRIPTION OF THE DRAWINGS

Embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will convey the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 4 is a diagram illustrating address information according to an embodiment of the present disclosure.

DETAILED DESCRIPTION

Specific structural or functional descriptions in the embodiments according to the concept of the present disclosure introduced in this specification are only for description of the embodiments according to the concept of the present disclosure. The embodiments according to the concept of the present disclosure may be practiced in various forms, and should not be construed as being limited to the embodiments described in the specification.

Figure 1:
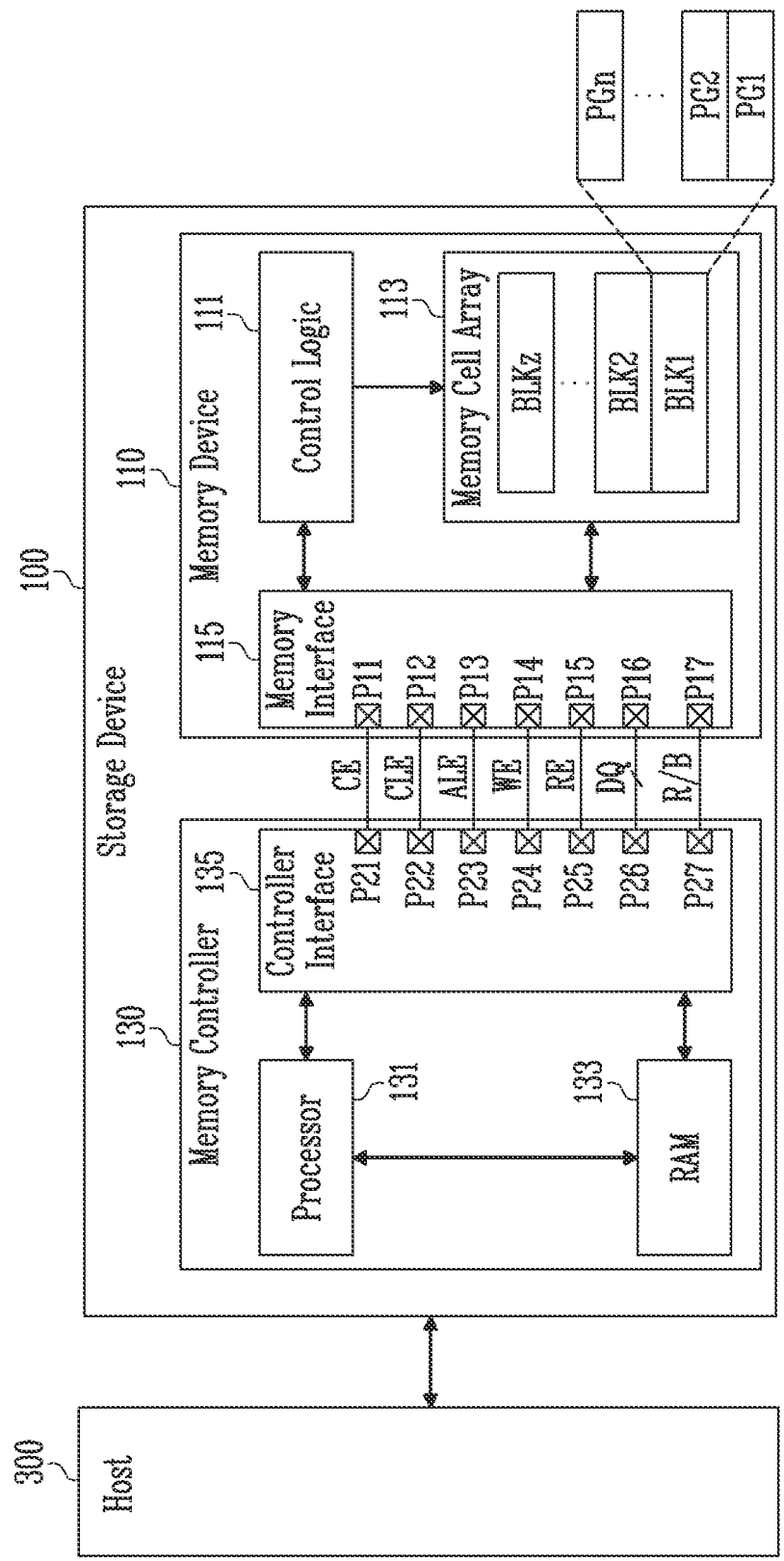
FIG. 1 is a diagram illustrating a storage device according to an embodiment of the present disclosure.

FIG. 1 is a diagram illustrating a storage device 100 according to an embodiment of the present disclosure.

Referring to FIG. 1, the storage device 100 may perform an operation corresponding to the request of a host 300. For example, when a write request, a logical address, and write data are received from the host 300, the storage device 100 may perform a write operation of storing the write data in a storage area corresponding to the logical address. For example, when a read request and a logical address are received from the host 300, the storage device 100 may perform a read operation of reading data stored in a storage area corresponding to the logical address.

In an embodiment, the storage device 100 may include at least one memory device 110 and a memory controller 130. The memory controller 130 may control the memory device 110. In an embodiment, the memory device 110 and the memory controller 130 may be implemented as a single integrated semiconductor package chip or as separate semiconductor package chips.

In an embodiment, the memory controller 130 may include a processor 131, a random access memory (RAM) 133, and a controller interface 135.

The processor 131 may control internal operations of the memory controller 130. In an embodiment, the processor 131 may perform a function of a flash translation layer (FTL). For example, when a logical address is received from the host 300, the processor 131 may translate the logical address into a physical address through an address mapping table. The physical address may include a column address and a row address. The processor 131 may provide the physical address to the memory device 110 through the controller interface 135. The address mapping table may contain information including mapping relationships between logical addresses and physical addresses. The address mapping table may be stored in the RAM 133 or the memory device 110. Further, when a request is received from the host 300, the processor 131 may generate a command corresponding to the request. For example, the processor 131 may generate a read command when a read request is received, and the processor 131 may generate a write command when a write request is received. The processor 131 may provide the command to the memory device 110 through the controller interface 135.

The RAM 133 may be used as a buffer memory, a working memory or a cache memory of the processor 131. In an embodiment, the RAM 133 may store data or an instruction. Here, the data may be write data received from the host 300, read data received from the memory device 110, or data processed by the processor 131 or scheduled to be processed by the processor 131. The instruction may be code executed by the processor 131. For example, the RAM 133 may be, but is not limited to, a static RAM (SRAM) or a dynamic RAM (DRAM), and may be implemented as various types of memories.

The controller interface 135 may transmit commands or addresses to the memory device 110 under the control of the processor 131. The controller interface 135 may receive data from the memory device 110. For this, the controller interface 135 may perform communication with a memory interface 115 of the memory device 110 through a communication protocol. For example, the communication protocol may be, but is not limited to, an open NAND flash interface (ONFI), and various types of communication protocols may be applied to the present disclosure.

In an embodiment, the controller interface 135 may include a plurality of pins P21 to P27, and the memory interface 115 may include a plurality of pins P11 to P17. The plurality of pins P21 to P27 of the controller interface 135 may be coupled to the corresponding pins of the plurality of pins P11 to P17 of the memory interface 115 to transmit and receive signals. The controller interface 135 may control the states of signals transmitted through the first pin P21 to the sixth pin P26. The memory interface 115 may control the states of signals transmitted through the sixth pin P16 and the seventh pin P17.

In an embodiment, a chip enable signal CE may be transmitted and received through the first pin P21 of the controller interface 135 and the first pin P11 of the memory interface 115. For example, when the chip enable signal CE is in a first state (e.g., high state), the state of the memory device 110 may transition to a low-power standby state. When the chip enable signal CE is in a second state (e.g., low state), the state of the memory device 110 may transition to a state in which the performance of an operation is enabled. That is, the memory device 110 may perform an operation while the chip enable signal CE is in the second state, and may suspend the operation while the chip enable signal CE is in the first state.

In an embodiment, a command latch enable signal CLE may be transmitted and received through the second pin P22 of the controller interface 135 and the second pin P12 of the memory interface 115. An address latch enable signal ALE may be transmitted and received through the third pin P23 of the controller interface 135 and the third pin P13 of the memory interface 115. In an embodiment, a write enable signal WE may be transmitted and received through the fourth pin P24 of the controller interface 135 and the fourth pin P14 of the memory interface 115. In an embodiment, a read enable signal RE may be transmitted and received through the fifth pin P25 of the controller interface 135 and the fifth pin P15 of the memory interface 115.

In an embodiment, a data signal DQ may be transmitted and received through the sixth pin P26 of the controller interface 135 and the sixth pin P16 of the memory interface 115. Furthermore, each of the sixth pins P26 and P16 may include a plurality of data pins. For example, the controller interface 135 may include first to eighth data pins, and the memory interface 115 may include first to eighth data pins. The first data pin of the controller interface 135 may be connected to the first data pin of the memory interface 115. In the same way, the data pins corresponding to each other may be connected to each other to transmit and receive data signals DQ. Although the number of data pins is described as 8, the present disclosure is not limited thereto, and may be modified into various numbers such as 16 and 32.

In an embodiment, during a period in which the write enable signal WE is in a first state (e.g., toggle state), the sixth pin P26 of the controller interface 135 may output a data signal DQ, and the sixth pin P16 of the memory interface 115 may receive the data signal DQ. In an embodiment, during a period in which the read enable signal RE is in a first state (e.g., toggle state), the sixth pin P16 of the memory interface 115 may output a data signal DQ, and the sixth pin P26 of the controller interface 135 may receive the data signal DQ.

In an embodiment, the data signal DQ may include at least one of a command, an address, and data. Here, the address may be a physical address or a dummy address. The data may be write data to be stored in the memory device 110 or read data that is read from the memory device 110.

In a detailed embodiment, the memory device 110 may identify whether a command is included in the data signal DQ received from the memory controller 130 depending on the state of the command latch enable signal CLE. For example, the data signal DQ transmitted during a period in which the command latch enable signal CLE is in a first state (e.g., high state) may include a command, and the data signal DQ transmitted during a period in which the command latch enable signal CLE is in a second state (e.g., low state) may not include a command. In an embodiment, the memory device 110 may identify whether an address is included in the data signal DQ received from the memory controller 130 depending on the state of the address latch enable signal ALE. For example, the data signal DQ transmitted during a period in which the address latch enable signal ALE is in a first state (e.g., high state) may include an address, and the data signal DQ transmitted during a period in which the address latch enable signal ALE is in a second state (e.g., low state) may not include an address.

In an embodiment, a ready/busy signal R/B may be transmitted and received through the seventh pin P17 of the memory interface 115 and the seventh pin P27 of the controller interface 135. That is, the seventh pin P17 of the memory interface 115 may transmit the ready/busy signal R/B to the seventh pin P27 of the controller interface 135. The memory controller 130 may identify the operating state of the memory device 110 using the read/busy signal R/B received from the memory device 110. For example, when the busy state (e.g., low state) of the ready/busy signal R/B may indicate that the memory device 110 is internally performing an operation, and the ready state (e.g., high state) of the ready/busy signal R/B may indicate that the memory device 110 does not internally perform an operation or that the memory device 110 has completed the operation.

In an embodiment, the memory device 110 may include a control logic 111, a memory cell array 113, and the memory interface 115.

The control logic 111 may control internal operations of the memory device 110. In an embodiment, the control logic 111 may control the memory cell array 113 to perform an operation corresponding to a command and a physical address that are received from the memory controller 130 through the memory interface 115. When a write command, a physical address, and data are received, the control logic 111 may control the memory cell array 113 to store the data in the storage area of the memory cell array 113 corresponding to the physical address. When a read command and a physical address are received, the control logic 111 may control the memory cell array 113 to read data from the storage area of the memory cell array 113 corresponding to the physical address.

The memory cell array 113 may include a plurality of memory blocks BLK1 to BLKz. Each of the memory blocks BLK1 to BLKz may include a plurality of pages PG1 to PGn. Each of the pages PG1 to PGn may store data. Here, each of the pages PG1 to PGn may be a unit on which a write operation of storing data or a read operation of reading stored data is performed, and each of the blocks BLK1 to BLKz may be a unit on which an erase operation of erasing stored data is performed. That is, data may be stored on a page basis.

The memory interface 115 may transfer a command or an address included in a data signal DQ received from the memory controller 130 to the control logic 111. The memory interface 115 may provide read data that is read from the memory cell array 113 to the memory controller 130. For example, the sixth pin P16 of the memory interface 115 may provide the read data as the data signal DQ to the memory controller 130 during a period in which the read enable signal RE is in a first state (e.g., toggle state). The toggle state may be a state in which the state of the signal periodically transitions.

In an embodiment, when a read request is received from an external system, the memory controller 130 may provide a read command and address information to the memory device 110. Here, the external system may be the host 300 or another external device. When the read command and the address information are received, the memory device 110 may perform a successive read operation or a normal read operation depending on the state of a dummy address included in the address information. Here, the address information may include a physical address and a dummy address. For example, the successive read operation may be an operation of sequentially reading pieces of data from storage areas starting from a selected page corresponding to the physical address. The normal read operation may be an operation of reading data only from the selected page corresponding to the physical address. The dummy address may be information (i.e., a flag signal) allocated not to indicate a physical address when the number of bits in the physical address is less than the number of bits in the address information.

The present disclosure may provide a storage device 100 that is capable of improving read performance and reducing power consumption by utilizing a dummy address, and a method of operating the storage device 100. Hereinafter, the present disclosure will be described in detail with reference to the attached drawings.

Figure 2:
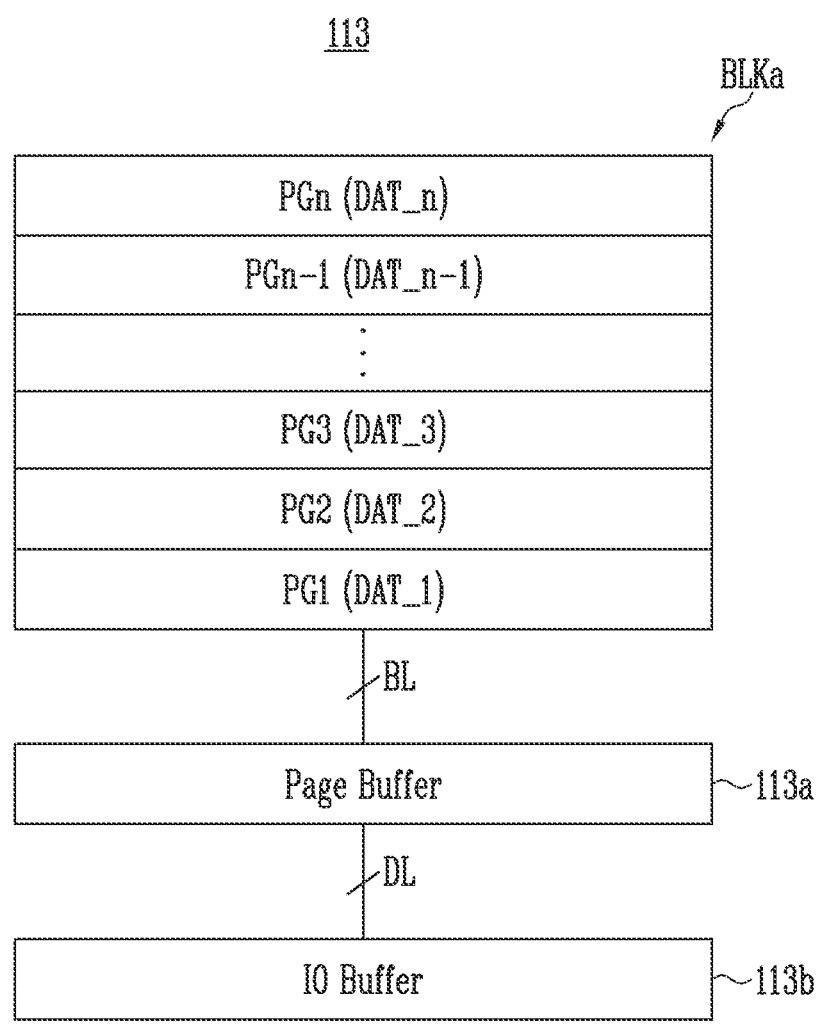
FIG. 2 is a diagram illustrating a memory cell array according to an embodiment of the present disclosure.

FIG. 2 is a diagram illustrating a memory cell array according to an embodiment of the present disclosure.

Referring to FIG. 2, the memory cell array 113 may include at least one memory block BLKa, a page buffer 113a, and an input/output (IO) buffer 113b. The memory block BLKa may be one of the plurality of memory blocks BLK1 to BLKz of FIG. 1, described above.

The memory block BLKa may include a plurality of pages PG1 to PGn. The pages PG1 to PGn may store pieces of page-wise data DAT_1 to DAT_n, respectively.

The page buffer 113a may be coupled to the memory block BLKa through a plurality of bit lines BL. The bit lines BL may correspond to column addresses among physical addresses. The page buffer 113a may be coupled to the input/output buffer 113b through a plurality of data lines DL.

In an embodiment, during a read operation, a read voltage may be applied to a word line of a page selected by the address among the plurality of pages PG1 to PGn. In this case, the page buffer 113a may read data from the selected page through the plurality of bit lines BL, and may temporarily store the read data. The page buffer 113a may transfer the temporarily stored data to the input/output buffer 113b through the plurality of data lines DL, and may be reset to erase the temporarily stored data. The input/output buffer 113b may temporarily store the data received from the page buffer 113a through the plurality of data lines DL. The input/output buffer 113b may transmit the temporarily stored data to the memory controller 130, and may be reset to erase the temporarily stored data.

In an embodiment, during a write operation, the input/output buffer 113b may temporarily store the data received from the memory controller 130. The input/output buffer 113b may transfer the temporarily stored data to the page buffer 113a through the plurality of data lines DL, and may be reset to erase the temporarily stored data. The page buffer 113a may temporarily store the data received from the input/output buffer 113b through the plurality of data lines DL, and may transfer the temporarily stored data to a page, selected by the address from among the plurality of pages PG1 to PGn, through the plurality of bit lines BL. When a program voltage is applied to the word line of the selected page, the selected page may store the data received from the page buffer 113a.

Figure 3:
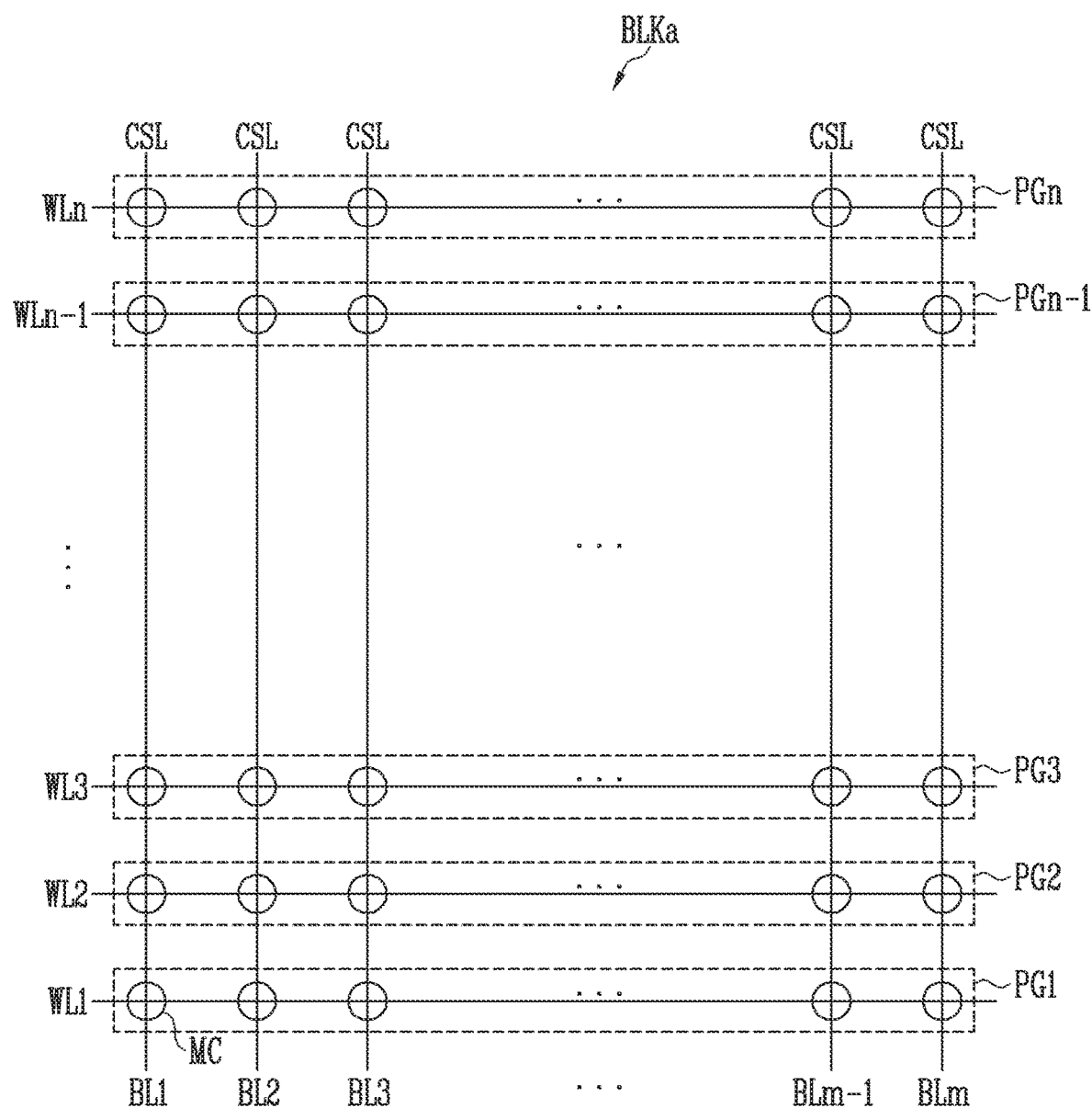
FIG. 3 is a diagram illustrating a memory block according to an embodiment of the present disclosure.

FIG. 3 is a diagram illustrating a memory block according to an embodiment of the present disclosure.

Referring to FIG. 3, the memory block BLKa may include a plurality of pages PG1 to PGn. Each of the plurality of pages PG1 to PGn may include a plurality of memory cells MC. That is, the memory block BLKa may include a plurality of memory cells MC.

Each memory cell MC may store one bit of data or two or more bits of data. The memory cell MC may be, but is not limited to, a NAND flash memory cell, and may be implemented as any of various types of memories such as magnetic RAM (MRAM) cell, a ferroelectric RAM (FeRAM) cell, a phase-change RAM (PRAM) cell, and a resistive RAM (RRAM) cell.

One page PG1 to PGn may be coupled to a corresponding word line among a plurality of word lines WL1 to WLn, and may be coupled to a plurality of bit lines BL1 to BLm. In consideration of the unit of the memory cell MC, each memory cell MC may be coupled to one of the plurality of word lines WL1 to WLn and one of the plurality of bit lines BL1 to BLm.

In an embodiment, the word lines WL1 and WLn and the bit lines BL1 to BLm may correspond to physical addresses. That is, the memory cells coupled to the word lines WL1 to WLn and the bit lines BL1 to BLm may be selected by the physical addresses.

FIG. 4 is a diagram illustrating address information according to an embodiment of the present disclosure.

Referring to FIG. 4, the memory controller (e.g., 130 of FIG. 1) may allocate a physical address to address information. The memory controller 130 may transmit the address information to the memory device (e.g., 110 of FIG. 1) through a plurality of data pins D1 to D8 during a plurality of cycles T1 to T5. The plurality of data pins D1 to D8 may be included in the above-described pins P26 and P16 of FIG. 1.

The address information may include a plurality of address bits A1 to A40. The address information may be divided into the plurality of address bits A1 to A40 depending on the cycles and data pins. For example, each of the plurality of address bits A1 to A40 may indicate one bit of information.

The row of the table illustrated in FIG. 4 indicates cycles during which address bits are transmitted, and the column of the table may indicate data pins through which address bits are transmitted. That is, during one cycle, one address bit may be transmitted through one data pin.

A period including the plurality of cycles T1 to T5 may be defined as an address period. The address period may include a time period during which an address is transmitted. For example, the first cycle T1 may be a first cycle of the address period. A second cycle T2 may be a cycle next to the first cycle T1. A third cycle T3 may be a cycle next to the second cycle T2. A fourth cycle T4 may be a cycle next to the third cycle T3. A fifth cycle T5 may be a cycle next to the fourth cycle T4. That is, the fifth cycle T5 may be a last cycle of the address period. Here, although the number of the plurality of cycles T1 to T5 is described as 5, the present disclosure is not limited thereto, and the number of cycles may be modified into various numbers.

The first data pin D1 may transmit a first address bit A1 during the first cycle T1, and thereafter transmit a ninth address bit A9 during the second cycle T2. Thereafter, the first data pin D1 may transmit a 17-th address bit A17 during the third cycle T3, transmit a 25-th address bit A25 during the fourth cycle T4, and thereafter transmit a 33-rd address bit A33 during the fifth cycle T5. In the same way, other data pins D2 to D8 may transmit address bits during respective cycles.

A physical address may be allocated to some of the plurality of address bits A1 to A40 included in the address information. A dummy address may be allocated to the remainder of the plurality of address bits A1 to A40.

The physical address may include a column address and a row address indicating the storage area of the memory device 110.

The column address may be an identifier for identifying one of the plurality of columns. The number of bits in the column address may be determined by the number of columns. Here, the column may correspond to memory cells included in one page or bit lines. For example, when the number of columns is 18,432, the minimum number of bits required to identify each column may be 15 bits. When the number of columns further increases, the size of a column address required to identify the memory cells in a specific column may further increase. That is, when the number of memory cells or the number of bit lines increases, the size of the column address may further increase.

The row address may be an identifier for identifying one of a plurality of rows. The number of bits in the row address may be determined by the number of rows. In an embodiment, the row address may include at least one of a page address, a block address, and a logical unit number (LUN) address. The page address may be an identifier for identifying a specific page among a plurality of pages. The block address may be an identifier for identifying a specific memory block among a plurality of memory blocks. The logical unit number (LUN) address may be an address for identifying a specific logical unit number among a plurality of logical unit numbers.

The dummy address may be dummy (or redundant) information which does not indicate the physical address. The dummy address may be information allocated to an area to which the physical address of the address information is not allocated when the number of bits for the physical address is less than the number of bits in the address information.

In an embodiment, the column address of the physical address may be allocated to at least some of a plurality of address bits A1 to A16 corresponding to the first cycle T1 and the second cycle T2. Further, the row address of the physical address may be allocated to at least some of a plurality of address bits A17 to A40 corresponding to the third cycle T3 to the fifth cycle T5. However, this is only an embodiment, and the number and order of cycles in which the column address and the row address are allocated may be modified into various forms.

For example, when the address information has 40 bits and that the column address of the physical address is 15 bits and the row address thereof is 24 bits, the memory controller 130 may allocate the column address to first to 15-th address bits A1 to A15 of the address information and allocate the row address to 17-th to 30-th address bits A17 to A30 of the address information. Further, the memory controller 130 may allocate the dummy address to the 16-th address bit A16 of the address information. In this case, the dummy address may be transmitted through the eighth data pin D8 during the second cycle T2.

For another example, when the address information has 40 bits and that the column address of the physical address is 16 bits and the row address thereof is 23 bits, the memory controller 130 may allocate the column address to first to 16-th address bits A1 to A16 of the address information and allocate the row address to 17-th to 29-th address bits A17 to A29 of the address information. Further, the memory controller 130 may allocate the dummy address to the 30-th address bit A30 of the address information. In this case, the dummy address may be transmitted through the sixth data pin D6 during the fourth cycle T4.

Although, in the above-described embodiment, the case where the dummy address is allocated to 1 bit is illustrated, this case is only an embodiment, and the present disclosure may be modified and practiced into a form in which the dummy address is allocated to a plurality of bits. In this case, the memory controller 130 may control the memory device 110 to perform a normal read operation or a successive read operation using the state of all or part of the dummy address allocated to the plurality of bits.

In an embodiment, when a read request and at least one logical address are received from an external system, the memory controller 130 may acquire at least one physical address corresponding to the at least one logical address from the mapping table. When one physical address is acquired, the memory controller 130 may allocate a dummy address in a second state to the address bit so as to control the memory device to perform a normal read operation. For example, the second state may be a low state. When a plurality of physical addresses are acquired, the memory controller 130 may allocate a dummy address in a first state to the address bit to control the memory device to perform a successive read operation. For example, the first state may be a high state. The above-described first state and second state are only examples, and thus the first and second states may be modified and defined as a low state and a high state, respectively.

Figure 5:
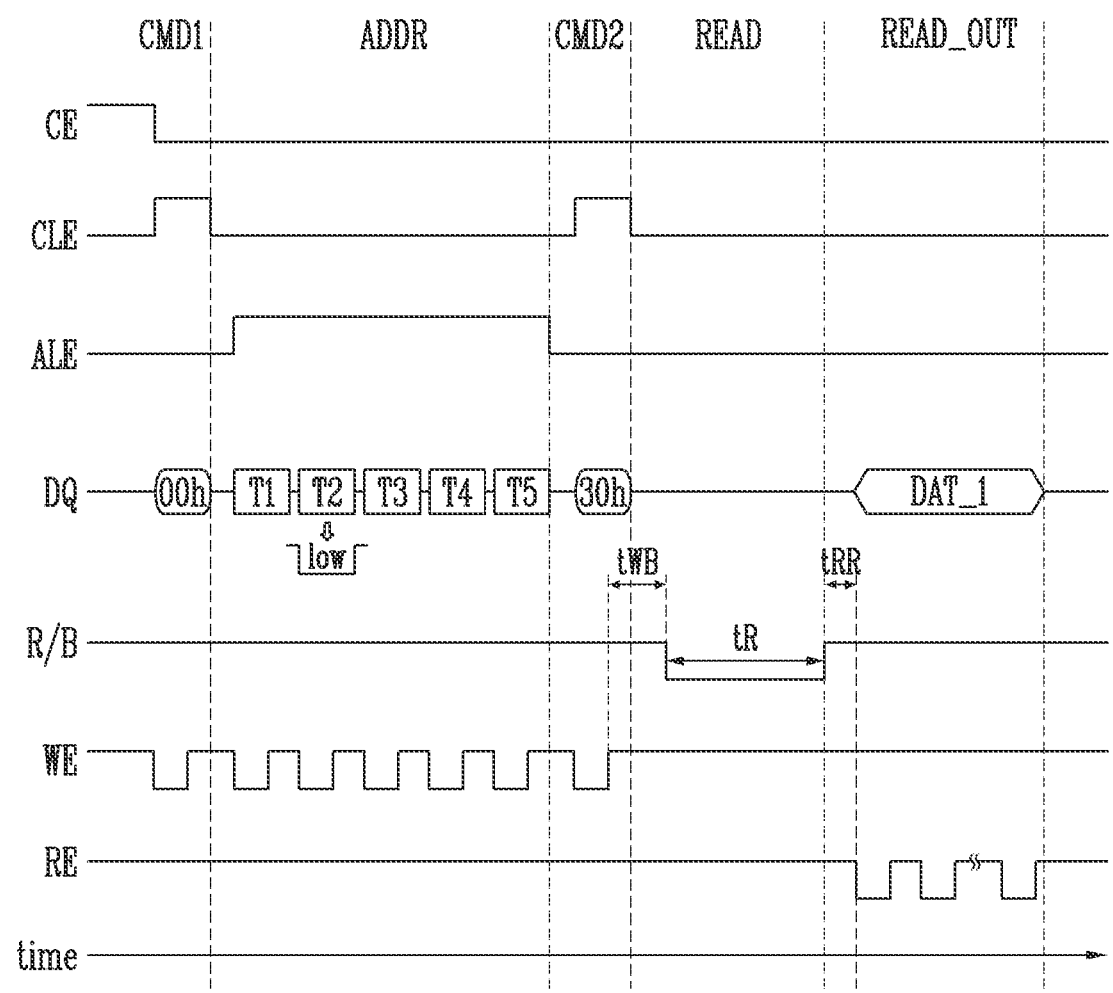
FIG. 5 is a waveform diagram illustrating a read operation according to an embodiment of the present disclosure.

FIG. 5 is a waveform diagram illustrating a read operation according to an embodiment of the present disclosure.

Referring to FIG. 5, during a normal read operation, the memory controller (e.g., 130 of FIG. 1) may transmit a control signal corresponding to a first command period CMD1, an address period ADDR, and a second command period CMD2 to a memory device (e.g., 110 of FIG. 1).

For example, a data signal DQ transmitted during the first command period CMD1 may be a first read command 00h, a data signal DQ transmitted during the address period ADDR may be address information, and a data signal DQ transmitted during the second command period CMD2 may be a second read command 30h. Here, the address information may include address bits corresponding to the first to fifth cycles T1 to T5, and a dummy address may be allocated to an address bit corresponding to the second cycle T2. In the normal read operation, the dummy address may be defined as a low state.

The memory device 110 may perform an operation in response to the received control signal. For example, the memory device 110 may read first data DAT_1 from a first storage area corresponding to the physical address of the address information during a read period READ. In this case, the memory device 110 may perform a read operation, and may output a ready/busy signal R/B indicating a busy state while performing the read operation. The memory device 110 may provide the read first data DAT_1 to the memory controller 130 during a readout period READ_OUT. Here, delay times tWB and tRR may occur based on the ready/busy signal R/B. For example, the first delay time tWB may be a time from the toggle end time point of a write enable signal WE to a time point at which the ready/busy signal R/B transitions from the ready state to the busy state, and the second delay time tRR may be a time from a time point at which the ready/busy signal R/B transitions from the busy state to the ready state to the toggle start time point of the read enable signal RE.

When pieces of data are successively read through a normal read operation, operations ranging from the first command period CMD1 to the readout period READ_OUT for next data need to be repeatedly performed after the readout period READ_OUT for the first data DAT_1. In particular, as transmission time for the read commands 00h and 30h and the address information, the delay times tWB and tRR, and the read operation time tR repeatedly occur, it may take a considerable time for the memory controller to transmit the first read command 00h and receive the read data.

In accordance with embodiments of the present disclosure, there can be provided a storage device that is capable of improving operation performance of each of a successive read operation of reading pieces of successive data and a normal read operation of reading one piece of data while distinguishing the successive read operation from the normal read operation by utilizing a dummy address, and a method of operating the storage device.

Figure 6:
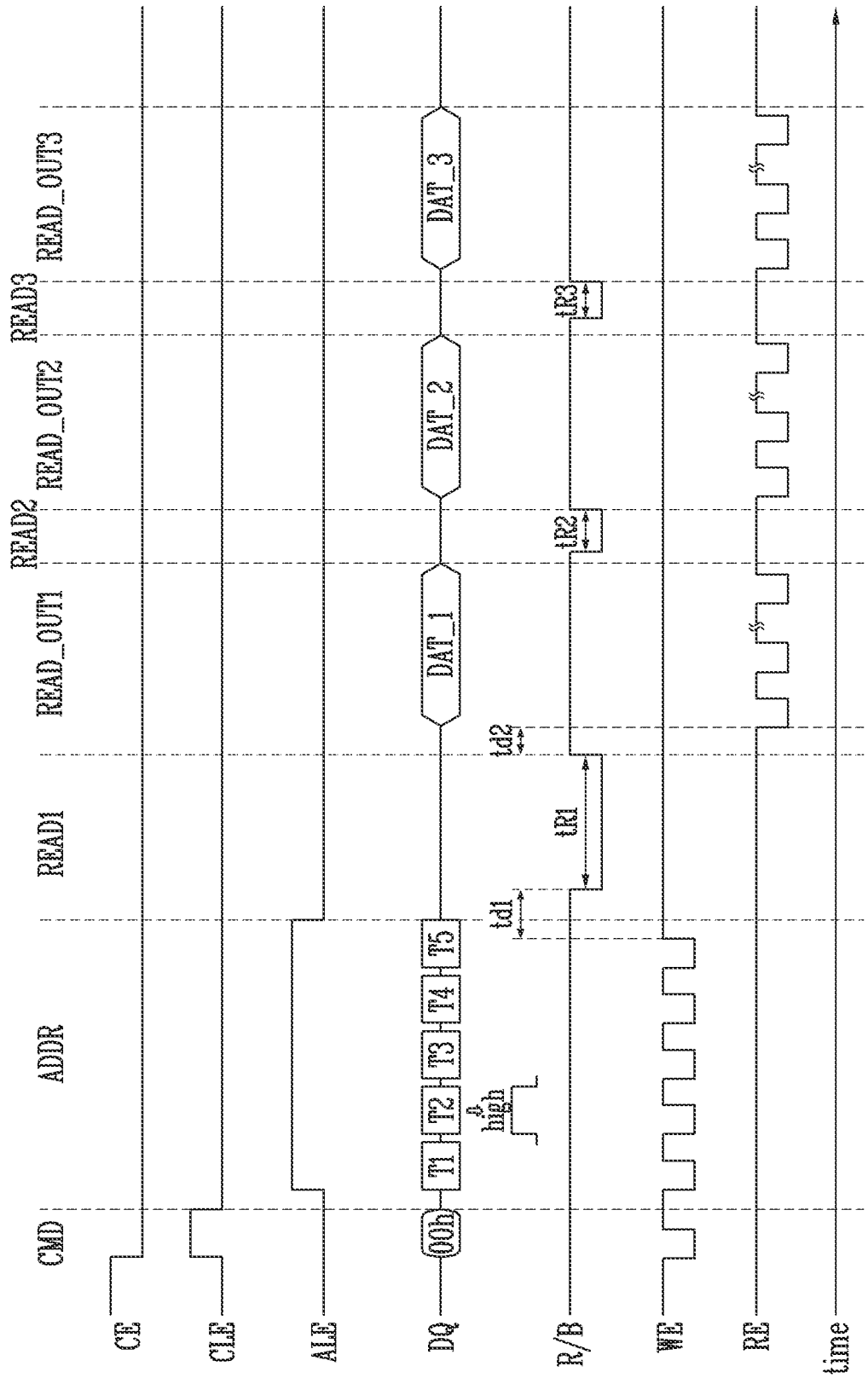
FIG. 6 is a waveform diagram illustrating a successive read operation according to an embodiment of the present disclosure.

FIG. 6 is a waveform diagram illustrating a successive read operation according to an embodiment of the present disclosure.

Referring to FIGS. 1 and 6, the memory controller 130 and the memory device 110 may transmit and receive various signals through the plurality of pins P21 to P27 and P11 to P17. For this operation, the memory controller 130 may transition a chip enable signal CE to a second state (e.g., low state). The operations and signals of the memory controller 130 and the memory device 110 when a successive read operation is performed will be described with reference to FIG. 6.

When a read request is received from an external system, the memory controller 130 may provide a read command 00h to the memory device 110 through a data pin. For example, the memory controller 130 may transmit a data signal DQ corresponding to the read command 00h through the data pin depending on the timing at which a write enable signal WE is toggled during a command period CMD. Here, the command period CMD may include an interval during which a command latch enable signal CLE provided from the memory controller 130 to the memory device 110 is in a first state (e.g., high state). When the transmission of the read command 00h is completed, the command latch enable signal CLE may transition to a second state (e.g., low state).

Further, during a preset time after the read command 00h has been provided, the memory controller 130 may provide the address information to the memory device 110 through the data pin. Here, the preset time may correspond to the time corresponding to an address period ADDR. For example, the memory controller 130 may transmit a data signal DQ corresponding to the address information to the memory device 110 through a data pin depending on the timing at which the write enable signal WE is toggled during the address period ADDR. Here, the address period ADDR may include an interval during which an address latch enable signal ALE is in a first state (e.g., high state). The address period ADDR may include a plurality of cycles T1 to T5. When the transmission of the address information is completed, the address latch enable signal ALE may transition to a second state (e.g., low state).

For this operation, the memory controller 130 may allocate a physical address and a dummy address to the address information. The address information may include a plurality of address bits identified by the plurality of cycles T1 to T5 and at least one data pin.

In an embodiment, the memory controller 130 may allocate a dummy address in a first state (e.g., high state) to the address bits so that the memory device 110 performs a successive read operation. For example, the column address of the physical address may be allocated to address bits to be transmitted during the first cycle T1 (and the second cycle T2), and the dummy address may be allocated to an address bit to be transmitted during the second cycle T2. The row address of the physical address may be allocated to address bits to be transmitted during the third to fifth cycles T3 to T5.

Furthermore, when the read command 00h and the address information are received, the memory device 110 may perform one of a successive read operation and a normal read operation depending on the state of the dummy address included in the address information. In an embodiment, when the state of the dummy address is the first state (e.g., high state) as illustrated in FIG. 6, the memory device 110 may perform the successive read operation. The successive read operation may be performed to sequentially read pieces of data from storage areas starting from a storage area corresponding to the physical address included in the address information. For example, when the physical address includes column address 1 and row address 1 (e.g., page 1, memory block 1, and LUN 1), the memory device 110 may first read data from a storage area corresponding to column address 1 and row address 1, and may read data from a second storage area corresponding to the next physical address while sequentially changing at least one of the column address and the row address. In an embodiment, when the state of the dummy address is the second state (e.g., low state), the memory device 110 may perform a normal read operation. The normal read operation will be described later with reference to FIG. 8.

Hereinafter, the detailed operation of the successive read operation will be described in detail.

In detail, when a read command 00h and address information are received, the memory device 110 may perform a first read operation of reading first data DAT_1 from a first storage area (e.g., page 1 of memory block 1) corresponding to a physical address during a first read period READ1. Here, the first storage area corresponding to the physical address may indicate a start position at which the successive read operation is performed. The memory device 110 may output a ready/busy signal R/B indicating a busy state (e.g., low state) during a first read operation time tR1. For example, after a first delay time td1 has elapsed from the toggle end time point of the write enable signal WE, the memory device 110 may output the ready/busy signal R/B in the busy state during the first read operation time tR1. When the first read operation is completed, the memory device 110 may output the ready/busy signal R/B indicating a ready state (e.g., high state).

In an embodiment, when the ready/busy signal R/B received from the memory device 110 transitions from the busy state to the ready state after the address information has been provided, the memory controller 130 may receive the first data DAT_1 from the memory device 110 through a data pin.

In detail, when the ready/busy signal R/B transitions from the busy state to the ready state after the address information has been provided, the memory controller 130 may transition a read enable signal RE to a toggle state during the first readout period READ_OUT1. For example, after a second delay time td2 has elapsed from a time point at which the ready/busy signal R/B transitioned from the busy state to the ready state, the memory controller 130 may transition the read enable signal RE to a toggle state. The toggle state may be a state in which the state of the signal is periodically changed. The first readout period READ_OUT1 may include an interval in which the read enable signal RE is in a toggle state.

Further, the memory device 110 may provide the first data DAT_1 to the memory controller 130 during the first readout period READ_OUT1. For example, the memory device 110 may transmit the data signal DQ corresponding to the first data DAT_1 to the memory controller 130 through a data pin depending on the timing at which the read enable signal RE is toggled. In an embodiment, while transmitting the first data DAT_1 to the memory controller 130, the memory device 110 may perform a second read operation of reading second data DAT_2 from the second storage area.

Furthermore, the memory controller 130 may receive the first data DAT_1 from the memory device 110 during the first readout period READ_OUT1. When the reception of the first data DAT_1 is completed, the memory controller 130 may terminate the toggling of the read enable signal RE. That is, the read enable signal RE may transition into a hold state. The hold state may be a state in which the state of the signal is maintained constant.

In an embodiment, after the first data DAT_1 is received, the memory controller 130 may receive second data DAT_2 that is data next to the first data DAT_1 from the memory device 110 through the data pin.

In detail, when the transmission of the first data DAT_1 is completed or the toggling of the read enable signal RE is terminated, the memory device 110 may perform a second read operation of reading second data DAT_2 from a second storage area (e.g., page 2 of memory block 1) next to the first storage area (e.g., page 1 of memory block 1) during a second read period READ2. Here, the memory device 110 may output a ready/busy signal R/B indicating a busy state during a second read operation time tR2. When the second read operation is completed, the memory device 110 may output the ready/busy signal R/B indicating a ready state.

Further, when the ready/busy signal R/B transitions from the busy state to the ready state after the first data DAT_1 has been received, the memory controller 130 may transition the read enable signal RE to a toggle state during a second readout period READ_OUT2. The second readout period READ_OUT2 may include an interval during which the read enable signal RE is in a toggle state.

Furthermore, the memory device 110 may provide the second data DAT_2 to the memory controller 130 during the second readout period READ_OUT2. For example, the memory device 110 may transmit the data signal DQ corresponding to the second data DAT_2 to the memory controller 130 through the data pin depending on the timing at which the read enable signal RE is toggled. In an embodiment, while transmitting the second data DAT_2 to the memory controller 130, the memory device 110 may perform a third read operation of reading third data DAT_3 from a third storage area.

Further, the memory controller 130 may receive the second data DAT_2 from the memory device 110 during the second readout period READ_OUT2. When the reception of the second data DAT_2 is completed, the memory controller 130 may terminate the toggling of the read enable signal RE.

After the second data DAT_2 has been received, the memory controller 130 may receive third data DAT_3 that is data next to the second data DAT_2 from the memory device 110 through the data pin. In detail, when toggling of the read enable signal RE is terminated, the memory device 110 may perform the third read operation of reading the third data DAT_3 from a third storage area (e.g., page 3 of memory block 1) next to the second storage area (e.g., page 2 of memory block 1) during a third read period READ3. The memory device 110 and the memory controller 130 may successively read the pieces of data by repeatedly performing the above-described operations.

In an embodiment, the memory controller 130 may transition the state of the chip enable signal provided to the memory device 110 into a first state (e.g., high state). When the state of the chip enable signal transitions to the first state (e.g., high state), the memory device 110 may terminate the successive read operation being performed. In an embodiment, the memory controller 130 may transmit an end command to the memory device 110. When the end command is received, the memory device 110 may terminate the successive read operation being performed.

According to embodiments of the present disclosure, pieces of data may be successively read by transmitting one read command 00h and the address information once without repeated transmission of two or more read commands (e.g., 00h, 30h, etc.) and address information. Accordingly, the time required to read data may be shortened, whereby read performance may be improved and power consumption may be reduced.

FIGS. 7A to 7E are diagrams illustrating a successive read operation according to an embodiment of the present disclosure.

Referring to FIGS. 7A to 7E, the memory block BLKa may include a plurality of pages PG1 to PGn. The pages PG1 to PGn may store respective pieces of data DAT_1 to DAT_n corresponding thereto. Here, a memory block BLKa and a first page PG1 are selected as the start area of a successive read operation by a physical address, and the successive read operation is performed in ascending order of a page number.

Figure 7A:
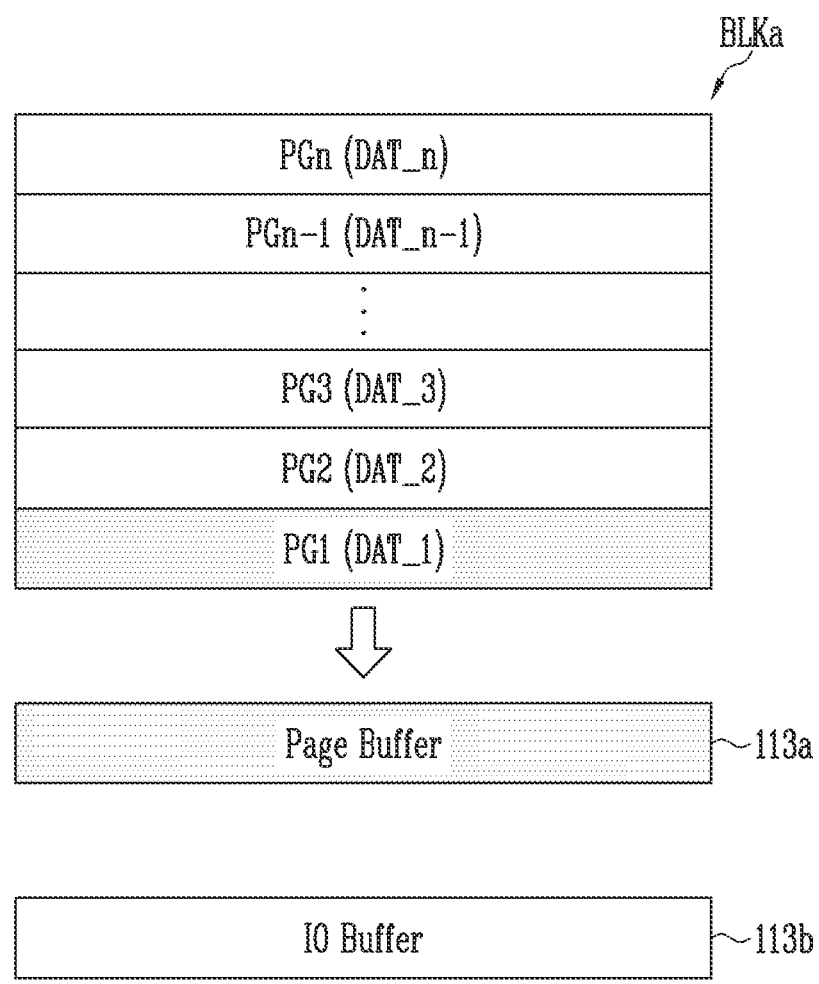
FIGS. 7A to 7E are diagrams illustrating a successive read operation according to an embodiment of the present disclosure.

Referring to FIGS. 6 and 7A, the control logic (e.g., 111 of FIG. 1) may receive a read command 00h and address information from the memory controller (e.g., 130 of FIG. 1). When a dummy address included in the address information is in a first state (e.g., high state), the control logic 111 may control the page buffer 113a to read first data DAT_1 from the first page PG1 of the memory block BLKa corresponding to the physical address included in the address information during a first read period READ1. In this case, the page buffer 113a may temporarily store the first data DAT_1.

Figure 7B:
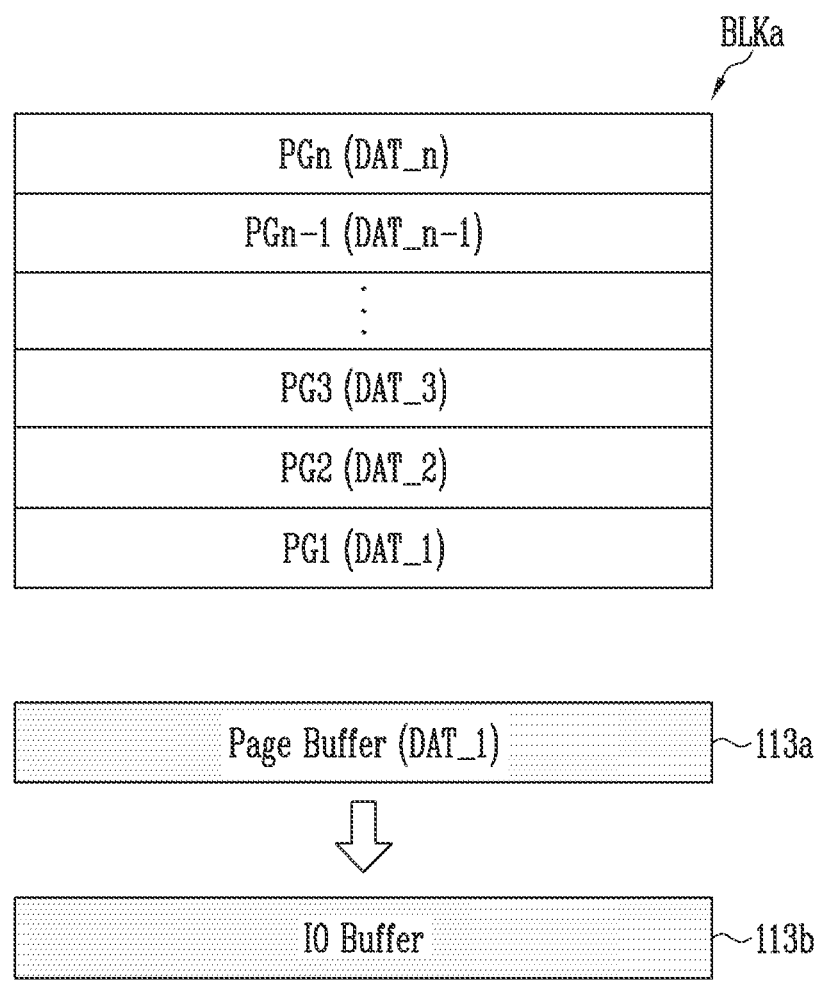

Further, referring to FIGS. 6 and 7B, the control logic 111 may control the input/output buffer 113b to read the first data DAT_1 from the page buffer 113a during the first read period READ1. In this case, the input/output buffer 113b may temporarily store the first data DAT_1. The control logic 111 may reset the page buffer 113a after the first data DAT_1 is transferred to the input/output buffer 113b.

Figure 7C:
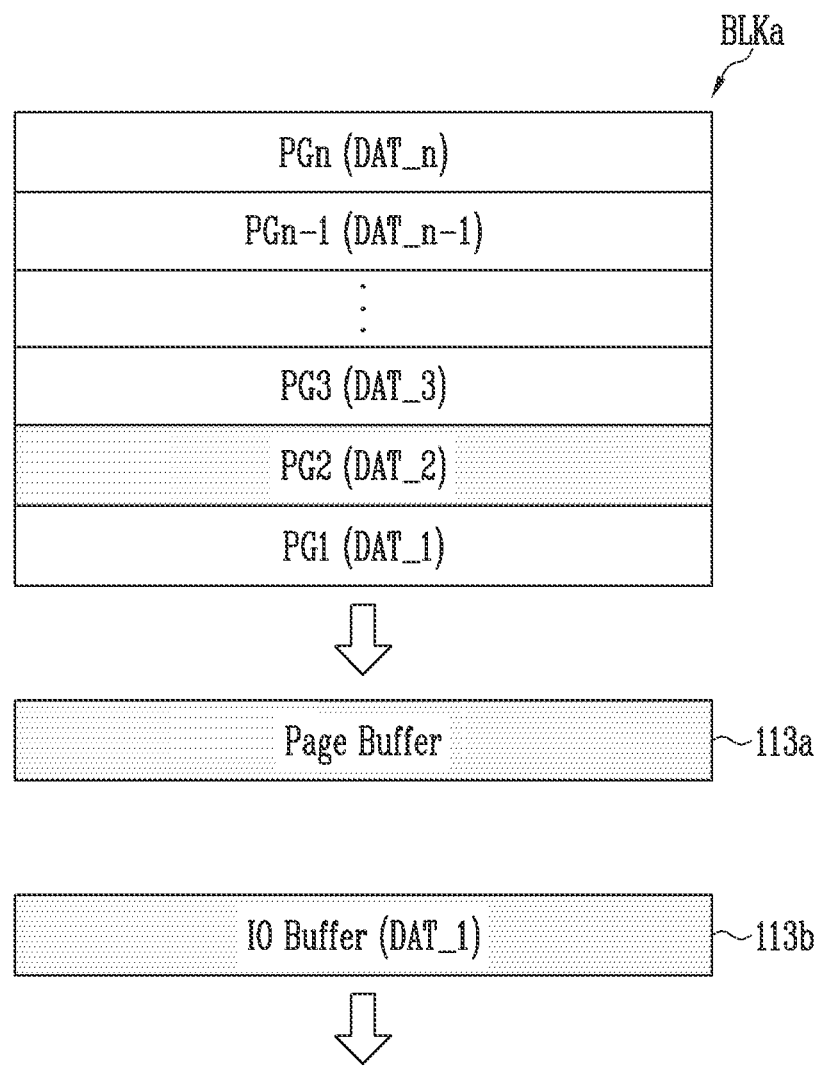

Further, referring to FIGS. 6 and 7C, the control logic 111 may control the input/output buffer 113b to provide the first data DAT_1 in the input/output buffer 113b to the memory controller 130 through a data pin during a first readout period READ_OUT1. After the first data DAT_1 is transferred to the memory controller 130, the control logic 111 may reset the input/output buffer 113b.

In an embodiment, the control logic 111 may control the page buffer 113a to read second data DAT_2 from a second page PG2 of the memory block BLKa during the first readout period READ_OUT1. In this case, the page buffer 113a may temporarily store the second data DAT_2.

Figure 7D:
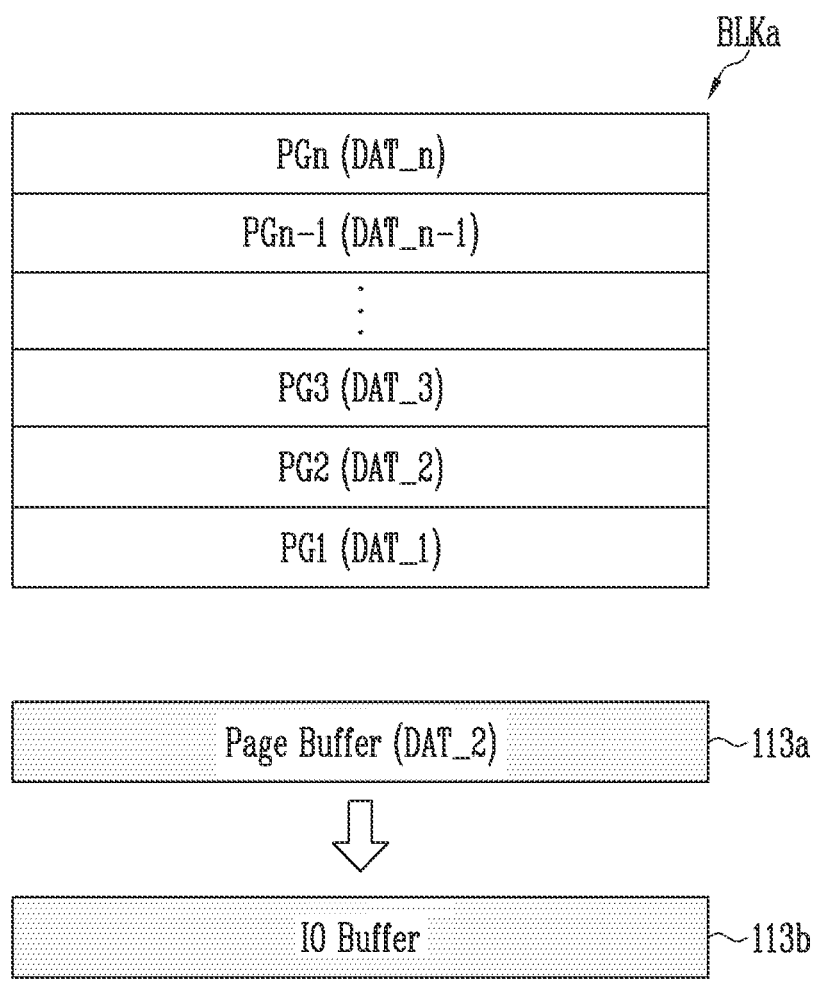

Further, referring to FIGS. 6 and 7D, the control logic 111 may control the input/output buffer 113b to read the second data DAT_2 from the page buffer 113a during a second read period READ2. In this case, the input/output buffer 113b may temporarily store the second data DAT_2. The control logic 111 may reset the page buffer 113a after the second data DAT_2 is transferred to the input/output buffer 113b.

Figure 7E:
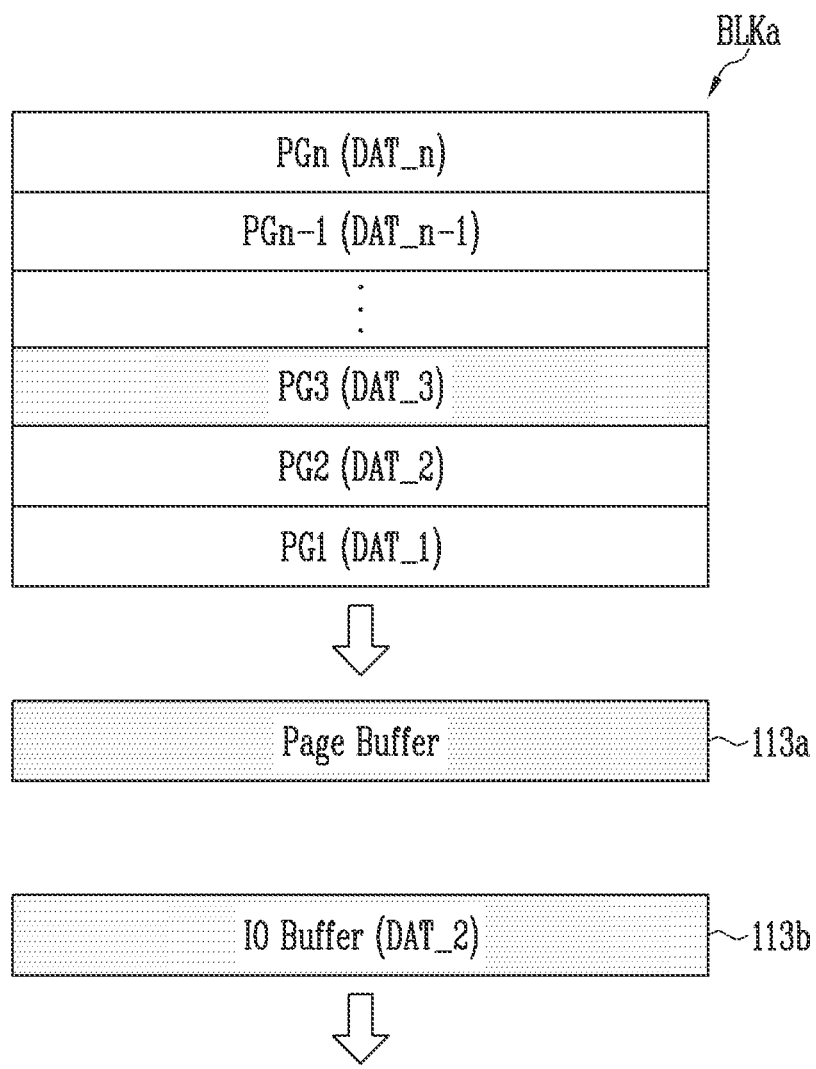

Further, referring to FIGS. 6 and 7E, the control logic 111 may control the input/output buffer 113b to provide the second data DAT_2 in the input/output buffer 113b to the memory controller 130 through the data pin during a second readout period READ_OUT2. After the second data DAT_2 is transferred to the memory controller 130, the control logic 111 may reset the input/output buffer 113b.

In an embodiment, the control logic 111 may control the page buffer 113a to read third data DAT_3 from a third page PG3 of the memory block BLKa during the second readout period READ_OUT2. In this case, the page buffer 113a may temporarily store the third data DAT_3. The control logic 111 may successively read pieces of data and provide the read data to the memory controller 130 by repeatedly performing the above-described operations.

In this way, according to embodiments of the present disclosure, while the input/output buffer 113b outputs data when the successive read operation is performed, the page buffer 113a reads the next data, thus improving the speed at which pieces of data are successively read.

Figure 8:
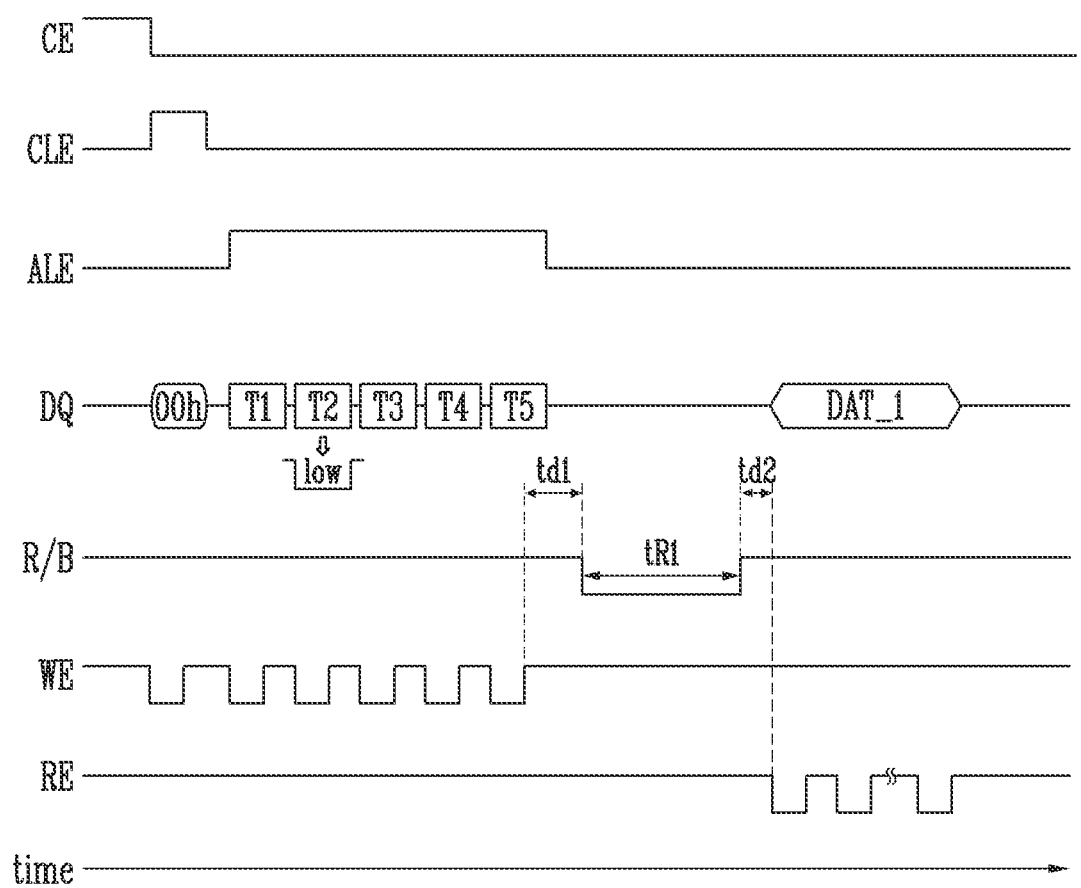
FIG. 8 is a waveform diagram illustrating a normal read operation according to an embodiment of the present disclosure.

FIG. 8 is a waveform diagram illustrating a normal read operation according to an embodiment of the present disclosure.

Referring to FIG. 8, when a dummy address is in a second state (e.g., low state), a normal read operation may be performed. Hereinafter, a description of configuration identical to that described with reference to FIG. 6 will be omitted.

In an embodiment, the memory controller (e.g., 130 of FIG. 1) may allocate a dummy address in a low state to an address bit so that the memory device (e.g., 110 of FIG. 1) performs a normal read operation. For example, the column address of the physical address may be allocated to address bits to be transmitted during the first cycle T1 (and the second cycle T2), and a dummy address may be allocated to an address bit to be transmitted during the second cycle T2. The row address of the physical address may be allocated to address bits to be transmitted during the third to fifth cycles T3 to T5.

Further, the memory controller 130 may provide a read command 00h to the memory device 110 through a data pin, and may provide address information to the memory device 110 through a data pin during a preset time after the read command 00h is provided.

When the read command 00h and the address information are received, the memory device 110 may perform one of a successive read operation and a normal read operation depending on the state of the dummy address included in the address information.

In an embodiment, when the state of the dummy address is the second state (e.g., low state) as illustrated in FIG. 8, the memory device 110 may perform a normal read operation. In detail, after a first delay time td1 has elapsed from the toggle end time point of the write enable signal WE, the memory device 110 may output the ready/busy signal R/B in the busy state during the first read operation time tR1. The memory device 110 may perform a read operation on a storage area corresponding to the physical address included in the address information during the first read operation time tR1. For example, when the physical address includes column address 1 and low address 1 (e.g., page 1, memory block 1, and LUN 1), the memory device 110 may read data from a storage area corresponding to column address 1 and row address 1. When the first read operation is completed, the memory device 110 may output the ready/busy signal R/B indicating a ready state (e.g., high state).

When the ready/busy signal R/B received from the memory device 110 transitions from the busy state to the ready state after the address information has been provided, the memory controller 130 may receive the first data DAT_1 from the memory device 110 through a data pin.

In detail, after a second delay time td2 has elapsed from a time point at which the ready/busy signal R/B transitioned from the busy state to the ready state, the memory controller 130 may transition the read enable signal RE to a toggle state. Further, the memory device 110 may transmit the data signal DQ corresponding to the first data DAT_1 to the memory controller 130 through the data pin depending on the timing at which the read enable signal RE is toggled. The memory controller 130 receives a data signal DQ corresponding to the first data DAT_1 through the data pin.

According to embodiments of the present disclosure, the time required to read data may be shortened by transmitting one read command 00h without transmitting two or more read commands (e.g., 00h, 30h, etc.), thus improving read performance and reducing power consumption.

Meanwhile, when a separate command is defined to distinguish a normal read operation from a successive read operation, a delay time attributable to the transmission of the command may occur. The present disclosure does not need to define a separate command by distinguishing a normal read operation from a successive read operation using a dummy address that is a redundant address bit out of the address information, thus reducing the delay time attributable to the separate command.

Figure 9:
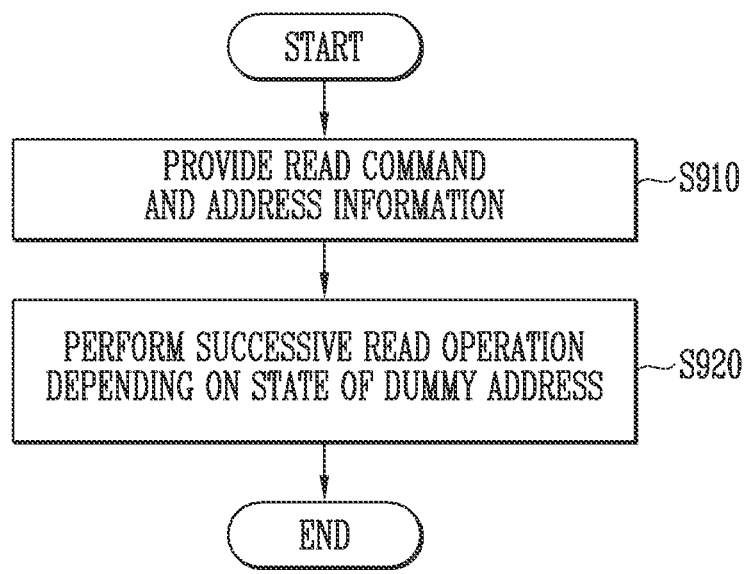
FIG. 9 is a flowchart illustrating a method of operating a storage device according to an embodiment of the present disclosure.

FIG. 9 is a flowchart illustrating a method of operating the storage device 100 according to an embodiment of the present disclosure.

Referring to FIG. 9, the storage device 100 may provide a read command and address information from the memory controller 130 to the memory device 110 at operation S910. The storage device 100 may include a memory device 110 including a plurality of storage areas, and a memory controller 130 which controls the memory device 110. The address information may include a physical address and a dummy address.

Next, the storage device 100 may perform a successive read operation depending on the state of the dummy address included in the address information at operation S920. For example, of the successive read operation and the normal read operation, one read operation corresponding to the state of the dummy address may be performed. The successive read operation may be an operation of sequentially reading pieces of data stored in storage areas starting from a selected storage area corresponding to the physical address among the plurality of storage areas. The normal read operation may be an operation of reading data stored in a selected storage area corresponding to the physical address.

Figure 10:
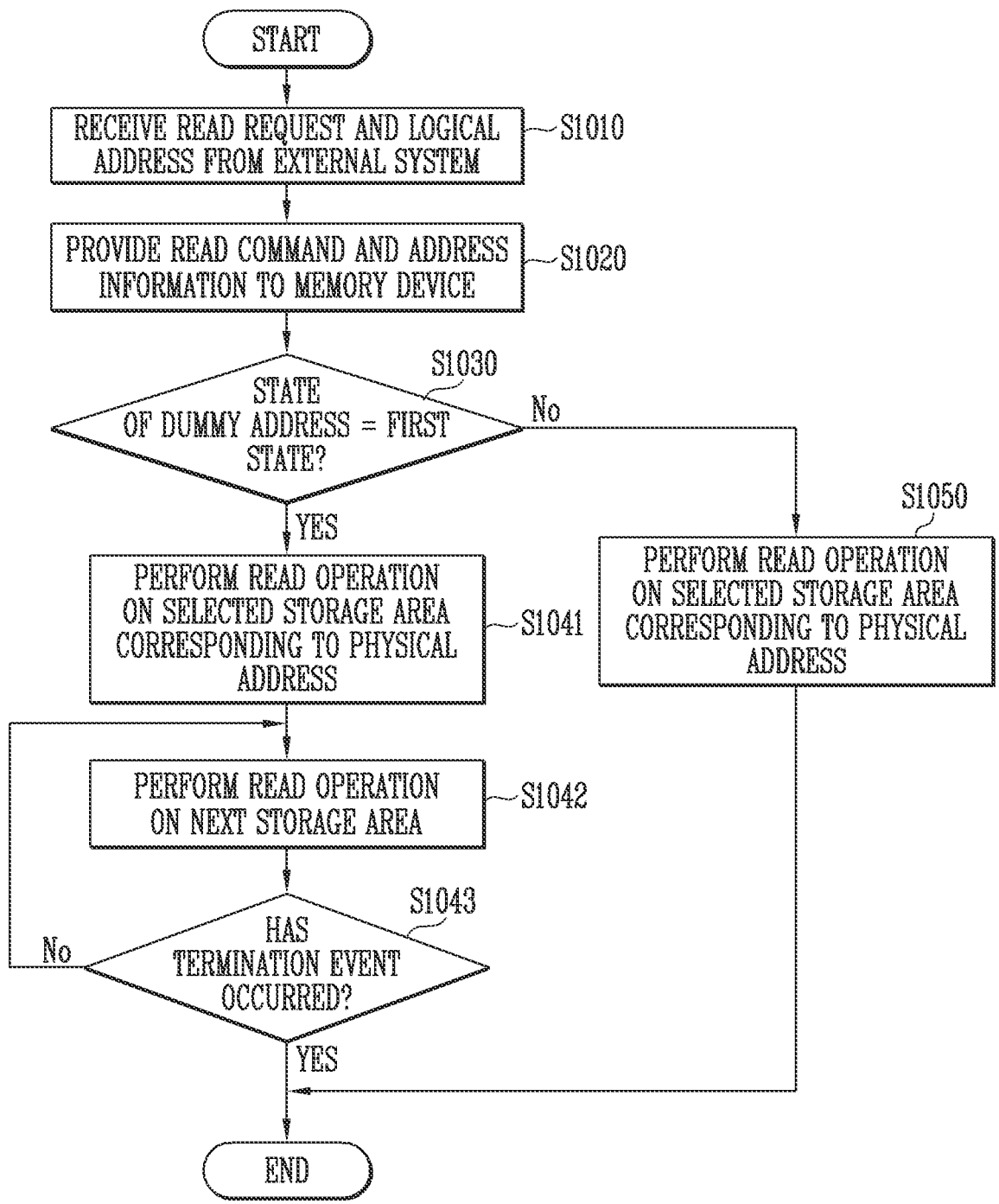
FIG. 10 is a flowchart illustrating in detail a method of operating a storage device according to an embodiment of the present disclosure.

FIG. 10 is a flowchart illustrating in detail a method of operating the storage device 100 according to an embodiment of the present disclosure.

Referring to FIG. 10, the storage device 100 may receive a read request and a logical address from an external system at operation S1010. In an embodiment, the storage device 100 may acquire a physical address corresponding to the logical address. When a plurality of physical addresses are acquired, the storage device 100 may generate address information including a dummy address in a first state (e.g., high state) and a physical address. When one physical address is acquired, address information including a dummy address in a second state (e.g., low state) and a physical address may be generated.

The storage device 100 may provide a read command and the address information from the memory controller 130 to the memory device 110 at operation S1020.

In an embodiment, the memory controller 130 may provide the read command to the memory device 110 during a command period in which a command latch enable signal CLE provided from the memory controller 130 to the memory device 110 is in a first state (e.g., high state).

In an embodiment, the memory controller 130 may provide the address information to the memory device 110 during an address period in which the command latch enable signal CLE is in a second state (e.g., low state) and the address latch enable signal ALE provided from the memory controller 130 to the memory device 110 is in a first state (e.g., high state).

During a cycle indicating a column address in the address period, the memory controller 130 may provide the dummy address to the memory device 110. During a cycle indicating a row address in the address period, the memory controller 130 may provide the dummy address to the memory device 110.

The storage device 100 may determine whether or not a state of the dummy address is a first state at operation S1030.

When the state of the dummy address is the first state (e.g., high state) (i.e., in case of Yes at the operation S1030), the memory device 110 may perform a successive read operation. On the other hand, when the state of the dummy address is the second state (e.g., low state) (i.e., in case of No at the operation S1030), the memory device 110 may perform a normal read operation.

In a detailed example, when the state of the dummy address is the first state (i.e., in case of Yes at the operation S1030), the memory device 110 may perform a read operation on a selected storage area corresponding to the physical address at operation S1041. For example, the selected storage area may be page 1 of memory block 1. However, this is only an embodiment, and various storage areas may be selected depending on the physical address.

In an embodiment, in the case where the successive read operation is performed, when the address information is provided from the memory controller 130 to the memory device 110, the state of the ready/busy signal that is provided from the memory device 110 to the memory controller 130 may transition to the busy state. While the ready/busy signal is in the busy state, data may be read from the selected storage area of the memory device 110.

For example, the memory device 110 may include the input/output buffer 113b. When the successive read operation is performed, first data stored in the selected storage area may be stored in the input/output buffer 113b included in the memory device 110. Further, when the first data is stored in the input/output buffer 113b, the state of the ready/busy signal transitions to the ready state, and the first data stored in the input/output buffer 113b may be provided to the memory controller 130.

After the read operation is performed on the selected storage area corresponding to the physical address, a read operation on the next storage area may be performed at operation S1042.

In an embodiment, when the first data stored in the input/output buffer 113b is provided, the state of the ready/busy signal transitions to the busy state, and second data in a storage area next to the selected storage area may be stored in the input/output buffer 113b. Further, when the second data is stored in the input/output buffer 113b, the state of the ready/busy signal transitions to the ready state, and the second data stored in the input/output buffer 113b may be provided to the memory controller 130.

In an embodiment, in the case where the successive read operation is performed, when the state of the ready/busy signal transitions from the busy state to the ready state, the state of a read enable signal provided from the memory controller 130 to the memory device 110 may transition to a toggle state. The first data or the second data stored in the input/output buffer 113*b* may be provided to the memory controller 130 while the read enable signal is in a toggle state.

The storage device 100 may determine whether or not a termination event has occurred at operation S1043.

Further, when a termination event does not occur (i.e., in case of No at the operation S1043), the successive read operation may continue to be performed. That is, when the termination event does not occur (i.e., in case of No at the operation S1043), a read operation may be performed on the next storage area at the operation S1042. When the termination event occurs (i.e., in case of Yes at the operation S1043), the successive read operation may be terminated.

In an embodiment, the termination event may be an event in which the state of the chip enable signal CE provided from the memory controller 130 to the memory device 110 transitions to a first state (e.g., high state). In an embodiment, the termination event may be an event in which a termination command is provided from the memory controller 130 to the memory device 110.

In an embodiment, the memory device 110 may include the page buffer 113*a* and the input/output buffer 113*b*. When the successive read operation is performed, second data stored in the next storage area may be stored in the page buffer 113*a* included in the memory device 110 while first data stored in the input/output buffer 113*b* is provided to the memory controller 130. Further, when the first data stored in the input/output buffer 113*b* is provided, the state of the ready/busy signal transitions to the busy state, and the second data stored in the page buffer 113*a* may be stored in the input/output buffer 113*b*.

In a detailed example, when the state of the dummy address is a second state (e.g., low state) (i.e., in case of No at operation S1030), the memory device 110 may perform a read operation on a selected storage area corresponding to the physical address at operation S1050. When the read operation on the selected storage area is completed, the operation may be terminated without performing a read operation on another storage area.

In accordance with the above-described embodiments of the present disclosure, there can be provided the storage device 100 that is capable of improving read performance and reducing power consumption, and a method of operating the storage device 100.

The present disclosure may provide a storage device that is capable of improving read performance and reducing power consumption and a method of operating the storage device.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the embodiments of the present disclosure have been described in the drawings and specification. Although specific terminologies are used here, those are only to describe the embodiments of the present disclosure.

Therefore, the present disclosure is not restricted to the above-described embodiments and many variations are possible within the scope of the present disclosure. It should be apparent to those skilled in the art that various modifications can be made on the basis of the technological scope of the present disclosure in addition to the embodiments disclosed herein. Furthermore, the embodiments may be combined to form additional embodiments.

What is claimed is:

1. A storage device comprising:
a memory device including a plurality of pages in which data is stored; and
a memory controller configured to provide, when a read request is externally received, address information including a physical address and a dummy address to the memory device,
wherein the memory device performs a successive read operation of sequentially reading data from pages starting from a selected page corresponding to the physical address, among the plurality of pages, according to a state of the dummy address.

2. The storage device according to claim 1, wherein:
the physical address corresponds to one of a column address and a row address; and
the dummy address is information on an area to which the physical address is not allocated.

3. The storage device according to claim 1, wherein the memory controller is configured to:
provide, when the read request is received, a read command to the memory device through a data pin; and
provide, during a preset period after the read command is provided, the address information to the memory device through the data pin.

4. The storage device according to claim 3, wherein the dummy address is provided to the memory device through the data pin during a cycle corresponding to a row address or a cycle corresponding to a column address in the preset period.

5. The storage device according to claim 3, wherein the memory controller is configured to sequentially receive, when the dummy address is a first state, data in the selected page and data in a page next to the selected page through the data pin.

6. The storage device according to claim 1, wherein the memory device is configured to:
receive the address information through a data pin;
perform, when the dummy address is a first state, the successive read operation; and
perform, when the dummy address is a second state, a normal read operation of reading data from the selected page.

7. The storage device according to claim 6, wherein the memory device is configured to sequentially provide, when the dummy address is the first state, data in the selected page and data in a page next to the selected page to the memory controller through the data pin.

8. The storage device according to claim 6, wherein the memory device comprises:
a page buffer coupled to the plurality of pages;
an input/output buffer coupled to the page buffer; and
a control logic configured to
control the input/output buffer to store data from the selected page in the page buffer,
store data, stored in the page buffer, in the input/output buffer, and provide data, stored in the input/output buffer, to the memory controller through the data pin in response to a read enable signal received from the memory controller.

9. The storage device according to claim 8, wherein the control logic is configured to, when the dummy address is the first state, control the page buffer to store data from a page next to the selected page in the page buffer while providing the data stored in the input/output buffer to the memory controller.

10. The storage device according to claim 9, wherein the memory controller is configured to transition, when a ready/busy signal received from the memory device transitions from a busy state to a ready state after the read command and the address information are provided to the memory device, the read enable signal to a toggle state so that the data, stored in the input/output buffer, is provided.

11. A method of operating a storage device including a memory device and a memory controller, the method comprising:
providing, by the memory controller, address information including a physical address and a dummy address from the memory controller to the memory device; and
performing, by the memory device, a successive read operation of sequentially reading data from storage areas starting from a selected storage area of the memory device corresponding to the physical address according to a state of the dummy address.

12. The method according to claim 11, wherein the performing the successive read operation comprises:
performing, based on the dummy address being a first state, the successive read operation; and
performing, based on the dummy address being a second state, a normal read operation of reading data stored in the selected storage area.

13. The method according to claim 12, wherein the performing the successive read operation further comprises:
transitioning, when the address information is provided, a ready/busy signal to a busy state and storing first data, stored in the selected storage area, in the input/output buffer;
transitioning the ready/busy signal to a ready state and providing the first data, stored in the input/output buffer, to the memory controller;
transitioning the ready/busy signal to a busy state, and storing second data, stored in a storage area next to the selected storage area, in the input/output buffer; and
transitioning the ready/busy signal to the ready state, and providing the second data in the input/output buffer to the memory controller.

14. The method according to claim 13, wherein:
the performing the successive read operation further comprises storing the second data, stored in the next storage area, in a page buffer while providing the first data in the input/output buffer; and
the storing the second data in the input/output buffer comprises transitioning the ready/busy signal to the busy state, and storing the second data, stored in the page buffer, in the input/output buffer.

15. The method according to claim 13, wherein:
the performing the successive read operation further comprises transitioning, when the ready/busy signal transitions to the ready state after the address information has been provided, a state of a read enable signal to a toggle state; and the first data or the second data stored in the input/output buffer is provided to the memory controller while the read enable signal is in the toggle state.

16. The method according to claim 13, wherein the performing the successive read operation further comprises terminating, when a state of a chip enable signal transitions to the first state, the successive read operation.

17. The method according to claim 13, wherein the performing the successive read operation further comprises terminating, when a termination command is provided from the memory controller to the memory device, the successive read operation.

18. The method according to claim 11, wherein the providing the read command and the address information comprises:
providing, during a command period in which a command latch enable signal is in a first state, the read command from the memory controller to the memory device; and
providing, during an address period in which the command latch enable signal is in a second state and an address latch enable signal is in a first state, the address information from the memory controller to the memory device.

19. The method according to claim 18, wherein the providing the address information comprises providing the dummy address from the memory controller to the memory device during a cycle indicating a column address in the address period.

20. The method according to claim 18, wherein the providing the address information comprises providing the dummy address from the memory controller to the memory device during a cycle indicating a row address in the address period.

21. A memory device comprising:
a plurality of pages configured to store data; and
a control logic configured to perform, when address information including a physical address and a dummy address is externally received, a successive read operation of sequentially reading data from pages starting from a selected page corresponding to the physical address, among the plurality of pages, according to a state of the dummy address.

22. The memory device according to claim 21, wherein:
when the dummy address is a first state, the successive read operation is performed; and
when the dummy address is a second state, a normal read operation of reading data from the selected page is performed.

23. The memory device according to claim 21, further comprising a memory interface including a plurality of data pins,
wherein the memory interface is configured to:
receive a read command through the plurality of data pins during a command period in which a command latch enable signal is in a first state; and
receive the address information through the plurality of data pins during an address period in which the command latch enable signal is in a second state and an address latch enable signal is in the first state.

24. The memory device according to claim 23, wherein:
the address period includes a plurality of cycles, each of which corresponds to one of a row address and a column address, and
the dummy address is received through one of the plurality of data pins during one of the plurality of cycles.

* * * * *